United States Patent
Zhu

(10) Patent No.: US 7,184,621 B1
(45) Date of Patent: Feb. 27, 2007

(54) MULTI-WAVELENGTH TRANSMITTER OPTICAL SUB ASSEMBLY WITH INTEGRATED MULTIPLEXER

(76) Inventor: Lijun Zhu, 4287 Creekview Dr., Dublin, CA (US) 94568

(\*) Notice: Subject to any disclaimer, the term of this patent is extended or adjusted under 35 U.S.C. 154(b) by 72 days.

(21) Appl. No.: 11/018,529

(22) Filed: Dec. 20, 2004

Related U.S. Application Data

(60) Provisional application No. 60/532,019, filed on Dec. 21, 2003.

(51) Int. Cl.
*G02B 6/43* (2006.01)
(52) U.S. Cl. .............................. 385/24; 385/89; 385/93
(58) Field of Classification Search .................... None
See application file for complete search history.

(56) References Cited

U.S. PATENT DOCUMENTS

| | | | | |
|---|---|---|---|---|
| 4,637,682 | A | * | 1/1987 | Mahlein et al. ............... 385/47 |
| 4,880,289 | A | * | 11/1989 | Imoto et al. .................. 398/42 |
| 5,625,403 | A | * | 4/1997 | Hazman .................... 347/239 |
| 6,201,908 | B1 | | 3/2001 | Grann |
| 6,493,121 | B1 | * | 12/2002 | Althaus ...................... 398/135 |
| 6,542,306 | B2 | | 4/2003 | Goodman |
| 6,563,976 | B1 | | 5/2003 | Grann |
| 6,571,033 | B2 | * | 5/2003 | Caracci et al. ............... 385/24 |
| 6,577,779 | B2 | * | 6/2003 | Watanabe ................... 385/11 |
| 6,636,658 | B2 | | 10/2003 | Goodman |
| 6,751,379 | B2 | | 6/2004 | Capewell |
| 6,769,816 | B2 | | 8/2004 | Capewell |
| 6,781,693 | B2 | | 8/2004 | Richard |
| 6,789,957 | B1 | | 9/2004 | Colgan |
| 2004/0101247 | A1 | * | 5/2004 | Chen et al. .................. 385/47 |

OTHER PUBLICATIONS

Datasheet for Mitsubishi Laser Diodes ML7XX8 Series, dated Nov. 1997. Found at http://pdf1.alldatasheet.com/datasheet-pdf/view/1974/MITSUBISHI/ML725B8F.html.*
IEEE Std. 802.3ae—2002, clause 53.

\* cited by examiner

Primary Examiner—Rodney Bovernick
Assistant Examiner—Mike Stahl

(57) ABSTRACT

A four-channel multi-wavelength transmitter optical sub assembly (TOSA) with an integrated multiplexer is described that includes four lasers, four collimating lenses, a multiplexer, an isolator, a focusing lens, and an optical fiber. The integrated multiplexer comprises three filters in two stages, with each filter combining a transmission and a reflection beam into one beam. Four collimated beams are combined into one beam and then focused onto the fiber by the focusing lens. The optical paths of all channels are short and possibly the same length. The invention allows using either transistor outline (TO) can packaged lasers or lasers in chip on submount. In some embodiments, four coupling lenses that focus the light onto fiber directly can be used instead of the collimating and focusing lenses, providing a more compact assembly. One or more filters can be beam-splitters to relax coating and assembling tolerances, thus reducing the cost.

20 Claims, 9 Drawing Sheets

MULTI-WAVELENGTH TRANSMITTER OPTICAL SUB ASSEMBLY WITH INTEGRATED MULTIPLEXER

CROSS-REFERENCE TO RELATED APPLICATIONS

This application claims the benefit of provisional patent application Ser. No. 60/532,019, filed Dec. 21, 2003 by the present inventor.

FEDERALLY SPONSORED RESEARCH

Not Applicable

SEQUENCE LISTING OR PROGRAM

Not Applicable

BACKGROUND OF THE INVENTION

1. Field of the Invention

The present invention relates generally to optical communication systems and, particularly to Coarse Wavelength Division Multiplexed (CWDM) fiber optic communication systems with small size optical transceivers.

2. Description of Related Art

Wavelength Division Multiplexing (WDM) technologies have been widely used in optical communication systems to provide much greater bandwidth than single wavelength communication systems. The wavelength spacing between channels in CWDM systems are much larger than that in DWDM systems, which allows the use of uncooled lasers. CWDM optical communication systems typically utilize 4 to 16 channels with about 20~25 nm channel spacing to provide low cost solutions to increase the bandwidth of a single fiber link. For example, IEEE 802.3ae 10 Gb/s Ethernet standard specifies a CWDM link so called LX4. The LX4 standard specifies four channels with channel wavelength centered at 1275.7 nm, 1300.2 nm, 1324.7 nm and 1349.2 nm. The wavelength range of each channel is 13.4 nm to accommodate wavelength drift of the laser over temperature. Each channel provides a 2.5 Gb/s data bandwidth. Other CWDM systems covers wavelength from 1610 nm, 1590 nm, 1570 nm, down to 1310 nm, and 1290 nm with 4~16 channels at a 20 nm channel spacing. In addition, there are other CWDM systems using vertical cavity surface emitting lasers (VCSEL) in 800 nm range, at wavelength from 780 nm to 860 nm. In CWDM transceiver modules, there is a need to multiplex the light from multiple lasers at different wavelengths to couple into a single fiber for light transmission. The CWDM transceivers typically need to support single mode, multimode, or both types of optical fiber.

Typically, for such a CWDM transmission system, the light from the laser at each wavelength is first coupled into an optical fiber using a fiber pigtailed package or a receptacle package. Then the light from multiple fibers is multiplexed into one fiber using an external fiber based multiplexer outside of transmission laser package. The fiber based multiplexer has multiple input fibers and one output fiber. FIG. 1 shows an example of such optical systems with four channels. Each of four lasers is individually packaged in a fiber pigtailed package 104*a*, 104*b*, 104*c* and 104*d*. Each single package is a single channel transmitter optical sub assembly (TOSA). For example, the pigtailed package 104*a* includes a laser die 101*a*, a coupling lens 102*a*, an isolator 103*a*, and a fiber pigtail 105*a*. Four fiber pigtails, 105*a*, 105*b*, 105*c*, and 105*d* are combined together through a fused fiber couple, which functions as a multiplexer with a fixed 6 dB loss in each channel. Generally, a fiber based multiplexer can be a fused fiber coupler with high loss, or a thin-film filter based zigzag optical path design with low loss, or other design such as using a gratings. Four individual TOSA and the external multiplexer together constitute a CWDM TOSA. This type of CWDM TOSA is bulky, costly, and involves significant challenges to manage the fiber inside a transceiver module. For example, to package four pigtailed lasers and the fiber based multiplexer into a LX4 transceiver module with limited space is very challenging and costly. Therefore, this approach is limited in the applications with large form factors, such as a XENPAK transceiver, not suitable for the application that uses small size optical transceiver modules, such as a X2, XFP or smaller form factors.

An alternative approach is to integrate the CWDM lasers and the multiplexer into a single package. The typical multiplexer for integration with lasers is a thin-film filter (TFF) based zigzag optical path design. For example, U.S. Pat. No. 6,769,816 by Capewell et al, and U.S. Pat. No. 6,201,908 by Grann describe transmitter systems with such an approach. The main drawback of this approach is that the optical path lengths are long and different for each channel. The very long optical paths for some channels often impose very tight package assembly and alignment tolerance. They also require large optical components such as TFF if standard transistor outline (TO) package lasers are used. Other multiplexer technologies can be integrated with lasers, such as grating-based multiplexer, planar light circuit, etc. In general, to keep the size small and optical paths relative short, lasers in bare die form are usually necessary to use these multiplexing approaches. They typically require expensive alignment and assembly equipments, as well as expensive processes to make such a CWDM TOSA. The size and cost, as well as performance over temperature and the long-term stability are still concerns to use a CWDM TOSA based on these designs. Thus such approaches are typically applicable to multimode applications with loose tolerances. They are very difficult to implement in single mode fiber applications, such as that required in LX4 standard.

Therefore, there is currently a demand for compact, cost effective, and highly integrated CWDM TOSA for optical communication systems, particularly inside optical transceivers. The present invention discloses a multi-wavelength TOSA with integration of lasers and a multiplexer in one package. The invention allows using either traditional low cost and proven TO-Can packaged lasers or lasers in bare die forms. The optical paths of all channels are short and possibly same length for all channels to have better tolerances.

SUMMARY OF THE INVENTION

In accordance with the present invention, multi-wavelength transmitter optical sub systems are presented with integration of multiple lasers and one multiplexer into a single package for cost effective and compact CWDM transceivers.

In the some embodiments, the TOSA comprises four lasers, four collimating lenses, three beam-splitters, an isolator, a focusing lens, and an optical fiber. A method of collimating-multiplexing-focusing is used to couple the light from lasers to the single optical fiber. The divergent light beams from four lasers are first collimated into four collimated beams. The collimated beams are combined into one collimated beam with a multiplexer consisting of three filters and then focused onto the fiber by the focusing lens. In some other embodiments, the system includes four lasers, four coupling lens lenses, three beam-splitters or filters, an isolator, and a fiber. The lenses are coupling lenses that couple the light into fiber directly without using another focusing lens. Four convergent beams after coupling lenses are combined into one convergent beam using multiplexer, then coupled into the fiber directly. In some embodiments, the collimating lenses or the coupling lenses can be molded glass or plastic parts with some surfaces coated as filters for the multiplexer.

The integrated multiplexer consists of three filters with a certain spatial configuration that combines four laser beams into one common optical path. The light in the common beam is then coupled onto the optical fiber. The multiplexer allows either the same or different optical path lengths from laser to the fiber for all four channels. The filters can be dielectric TFF filters or beam-splitters, or a combination of filters and beam-splitters. The use of three filters is lowest loss but more expensive. The use of three beam-splitters is low cost but with 6 dB nominal loss for each channel. A combination of two filters and one beam-splitter, or one filter and two beam-splitters can provide a nominal 3 dB loss with relatively lower cost than use of three filters.

One feature of the present invention is that it allows the choice of using either conventional TO can packaged CWDM lasers, or the lasers in bare die form such as chip-on-carrier format. The TO can package can be a flat window capped TO can, or coupling lens capped TO can. The lasers can be CWDM edge emitting lasers or VCSEL lasers. Another feature of the invention is that it be easily implemented for both single mode and multimode fiber applications. The receiving fiber can be easily implemented in form of fiber pigtail or fiber stub in a receptacle, with a flat polished or angle polished end face.

In the some embodiments where collimating lenses are used, the method of assembling a TOSA is passively assembling the multiplexer, collimating and focusing lenses, and the fiber, and then actively aligning and attaching laser packages to the passively assembled package. Conventional laser welding, soldering, or epoxy process can be used with active alignment to attach the laser packages. The alignment should be done individually channel by channel. The isolator may or may not be necessary for some applications.

The advantages of the current invention over prior arts are: It provides compact, cost-effective and integrated optical sub assembly that can be employed to build compact CWDM transceiver modules. The optical paths between lasers and the common fiber can be very short and same length for all 4 channels, thus providing better alignment and assembly tolerances. The invention allows use of conventional proven TO can based technologies such that cost effective packaging process such as using laser welding process can be used to align and attach the lasers forreliable CWDM TOSA.

It will be appreciated that, for the purposes of illustration, the above figures are not necessarily drawn to scale or with real dimensions.

DETAILED DESCRIPTION

Figure 1:
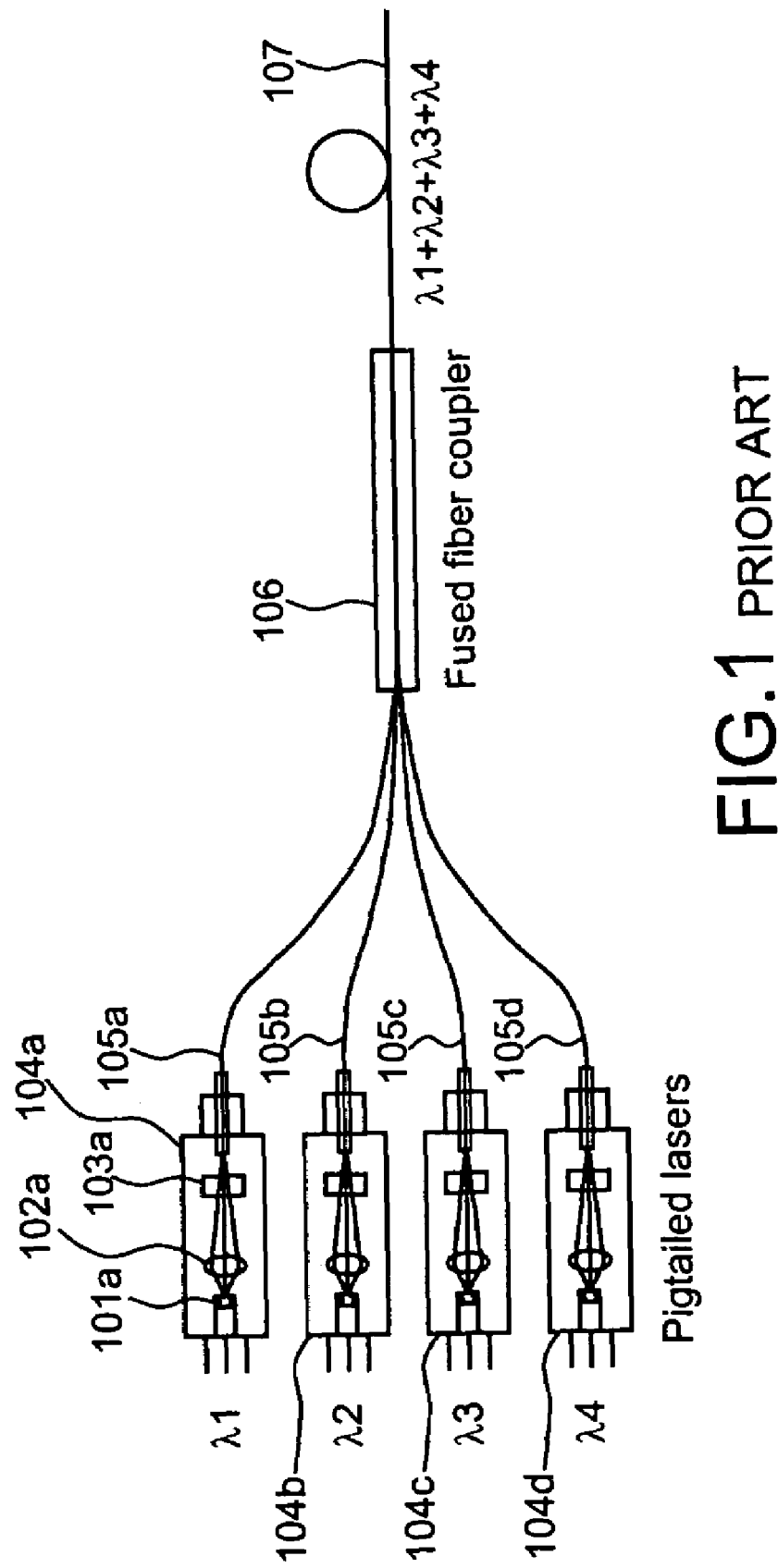
FIG. 1 shows a prior art of a CWDM TOSA using four pigtailed lasers and a fused fiber coupler as the multiplexer.
Figure 2:
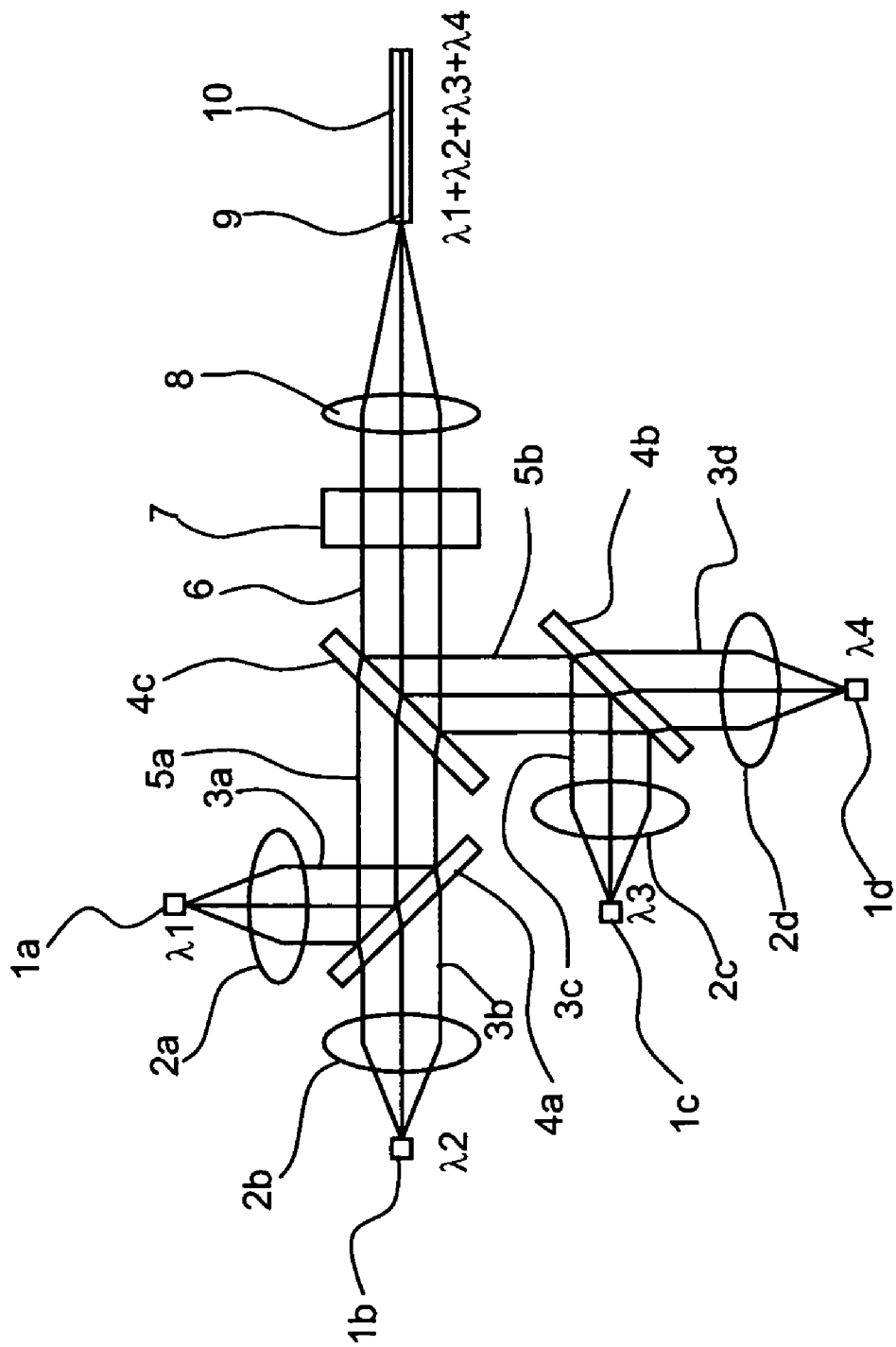
FIG. 2 is a diagram of an embodiment of the multi-wavelength TOSA using collimating and focusing lenses with the collimated beams combined with a three-filter multiplexer.

FIG. 2 illustrates a diagram of an embodiment of a multi-wavelength TOSA with collimated beams combined by a multiplexer consisting of three filters. The optical system includes four CWDM channels. Four CWDM lasers 1a, 1b, 1c, and 1d are centered at wavelength $\lambda 1$, $\lambda 2$, $\lambda 3$, $\lambda 4$, respectively. The divergent laser beams from laser 1a, 1b, 1c, and 1d are collimated by lens 2a, 2b, 2c, and 2d to form collimated beam 3a, 3b, 3c, and 3d, respectively. The collimated beam 3a is reflected by the filter 4a; and beam 3b passes through filter 4a. Thus beam 3a and 3b are combined by filter 4a into a common optical path to form a beam 5a. Filter 4a is an optical filter with dielectric thin-film coating in one surface that reflects wavelength $\lambda 1$ and passes wavelength $\lambda 2$. The beam 5a contains the light at both wavelength $\lambda 1$ and $\lambda 2$. The angle of incidence of beam 3a and 3b is 45 degrees so that the beam after the filter 4a has the same optical path. Similarly beam 3c and 3d are combined by filter 4b to from beam 5b, which contains the light at both wavelength $\lambda 3$ and $\lambda 4$. Again, beam 5a and 5b are combined by filter 4c to form beam 6, which contains the light at all four wavelengths. The combined beam 6 passes through an isolator 7 and is then focused into an optical fiber 9 by a focusing lens 8. The optical fiber 9 is held inside a fiber stub 10.

Figure 3B:
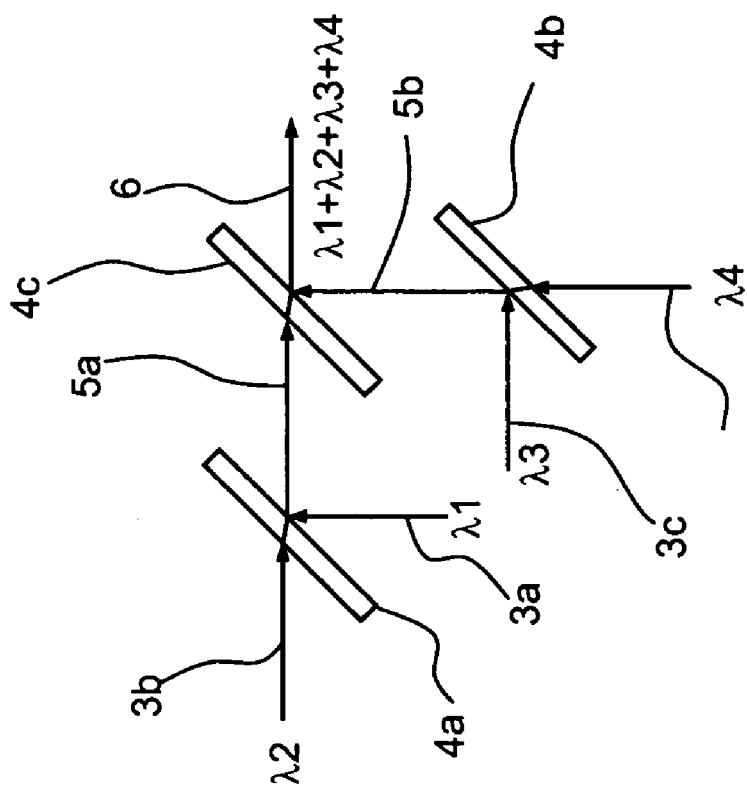
FIG. 3a and FIG. 3b show configurations of the multiplexer consisting of three filters. The filters combine four beams in one common optical beam.
Figure 3A:
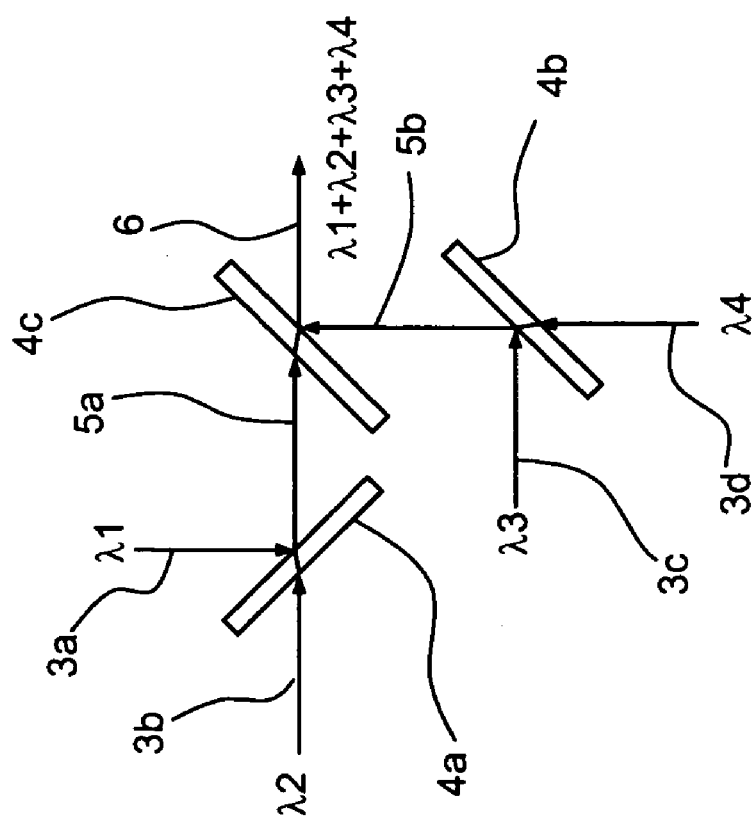

FIG. 3a and FIG. 3b further illustrate the principle of multiplexing four CWDM laser beams into a single beam using three filters, 4a, 4b, and 4c. Filter 4a, 4b, and 4c have specific spatial locations and orientations so that they combine four beams into one beam through two stages. In some embodiments and as shown in FIG. 3a and FIG. 3b, filter 4a, 4b or 4c are oriented at 45° or 135° with respect to the direction of combined laser beam 6. FIG. 3a and FIG. 3b show two different configurations. In other embodiments, filter orientations can be other angles, as long as the reflection beam and transmission beam are in the same optical path after the filter. The directions of the incident beams need to be adjusted accordingly and matched with orientation of filters. The above angle is mainly determined so that four CWDM lasers 1a, 1b, 1c and 1d can be conveniently spaced and oriented for easy packaging of the TOSA.

In some embodiments, filter 4a, 4b, and 4c are dielectric thin film coated optical filter that reflects certain wavelength band and transmits another wavelength band. For example as shown in FIG. 2, FIG. 3a and FIG. 3b, filter 4a transmits wavelength λ2 and reflects λ1; filter 4b transmits wavelength λ4 and reflects λ3; and filter 4c transmits wavelength λ1 and λ2 and reflects λ3 and λ4. For CWDM systems, each filter needs to be band-pass filter with the pass band and reflection band covering entire wavelength range of the related laser. For example, for standard LX4 transceivers, the filter pass band and reflection band need to be 13.4 nm minimum centered at nominal channel center wavelengths. Ideally, such a three-filter multiplexer is low loss due to that filter can reflect or transmit greater than 95% of light. So the nominal loss of the multiplexer for each channel can be less than 1 dB.

Typically, the transition edge between pass band and reflection band of a thin film filter can be shifted in wavelength with the variation of light angle of incidence (AOI). The shift can be very sensitive to the variation of AOI at large AOI. For example at AOI=45°, the pass band of the filter can shift about 15 nm when the AOI is varied from 45° to 46° for band pass filter with pass band center wavelength at about 1300 nm. This effect causes the filter pass band and reflection band shift significantly when filter placement is little off from nominal angle. Therefore, the tolerance requirement for the implementation of the TOSA is high for both component placement and filter coating. However, the overall cost can still be lower than other approaches such as zig-zag multiplexer or a fused coupler approach, due to better laser active alignment cost benefit from short optical path in the present invention.

In some embodiments, filter 4a, 4b, or 4c can be tolerance relaxed filters or beam-splitters, thus the system cost can be lowered. By arranging non-adjacent channels in wavelength for filter 4a and 4b, the requirement of the filter coating and angle placement tolerance can be greatly relaxed. For example for a 24.5 nm wavelength spaced LX4 CWDM system, λ1=1275.7±6.7 nm, λ2=1324.7±6.7 nm, λ3=1300.2±6.7 nm, λ4=1349.2±6.7 nm, then the transition between pass band and reflection band of filter 4a and 4b can be 35.6 nm. The filter with large transition band is less sensitive to coating tolerance, thus very easy to make and low cost, the angle placement tolerance of the filter is also greatly relaxed. Meanwhile, filter 4c can be broadband 50% transmission 50% reflection beam-splitters covering all the wavelength range of four CWDM lasers. Such a combination provides a nominally 3 dB loss, low cost multiplexer system. In some other embodiments, filter 4a, 4b, and 4c can all be 50/50 broadband beam-splitters, thus the multiplexer have a 6 dB nominal loss. The 6 dB loss is the same as fused coupler based multiplexer. In some. CWDM TOSA, 6 dB loss is allowable if the laser has sufficient power. For example, typical distributed feed back (DFB) lasers have a 5 mW output optical power; the power requirement in 10 Gb/s LX4 is only about 0.5 mW. Therefore, the total allowable loss can be 10 dB. The 6 dB multiplexer loss still allows another 4 dB margin for other losses, such as alignment tolerance in the TOSA optical system.

In some embodiments where filter 4c is a 50/50 beam-splitter, the other output beam after beam-splitter 4c (i.e the beam going upward in FIG. 3a at filter 4c) can also be used for other purpose. For example, the beam can be used as power monitoring of all 4 channels with a receiving detector.

The size of three-filter multiplexer can be very small depending on the beam size Typically if the laser beam is about 12 mm in diameter, then the multiplexer configuration shown in FIG. 3a and FIG. 3b can be as small as 5 mm×5 mm. Since there is no zigzag optical path, the optical path from laser to fiber is short and about the same length. Beam-splitter is typically much lower cost than typical thin filter used in zigzag path design, thus the cost of the TOSA based on this multiplexer design is low. In addition, the short optical path also looses the alignment tolerances, thus allowing low cost alignment and assembly process to produce the TOSA.

The embodiment as shown in FIG. 2 is a complete optical system for a CWDM TOSA including all optical components. The laser can be either DFB or VCSEL lasers. The laser can be either a flat window TO CAN packaged, or the laser chip packaged on a sub-mount. For example, flat window TO packaged DFB is commercially available to use from several vendors. In some embodiments, an isolator is required to prevent any light back to lasers for adverse effects. In other embodiments, the isolator may not be necessary if the laser is not sensitive to back reflection. Typically the collimating lenses are aspheric glass lenses, with focal length and working distance determined by laser package used. If flat window TO CAN lasers are used, the focal length is typically long in a range of 1~2 mm. If chip-on-submount laser packages are used, then smaller lens with focal length less than 1 mm can be used to construct very compact CWDM TOSA. The focusing lens is typically an anti-reflection (AR) coated aspheric glass lens, but other type of lens such as low cost spherical lens or ball lens may be used if more loss is allowed. In general, the Numerical Aperture (NA) of the collimating lens should match the NA of laser; and the NA of focusing lens and the fiber should match to obtain best coupling efficiency. Commercially available lenses can be used, such as the lenses from Panasonic and ALPS. The fiber side can be a receptacle or a pigtailed fiber. The fiber can be either single mode or multimode. A fiber stub is typically used, and the end face of the fiber stub can be either flat or angle polished.

To use the present invention to construct a CWDM TOSA, a mechanical housing is necessary to hold the optical components. A general assembly process is first to passively place all passive optical components, including lenses, filters, the isolator, and the fiber into the housing with correct location and orientation. Lasers are then be actively aligned and attached to the main housing. The assembly process can be laser welding process, soldering, or epoxy process. The size of the TOSA depends on the size of the laser package and the corresponding lens size and focal length. As an example, the housing can be a machined metal housing that lenses, beam-splitters, and the isolator are attached using epoxy by passively dropping in. With flat window TO38 can packaged DFB lasers, aspheric glass lenses with focal length about 1.4 mm and 3 mm for collimating and focusing, respectively. The beam size is about 1 mm in diameter. Then the integrated TOSA optical part size can be estimated as small as 12 mm×15 mm×5 mm.

Figure 4A:
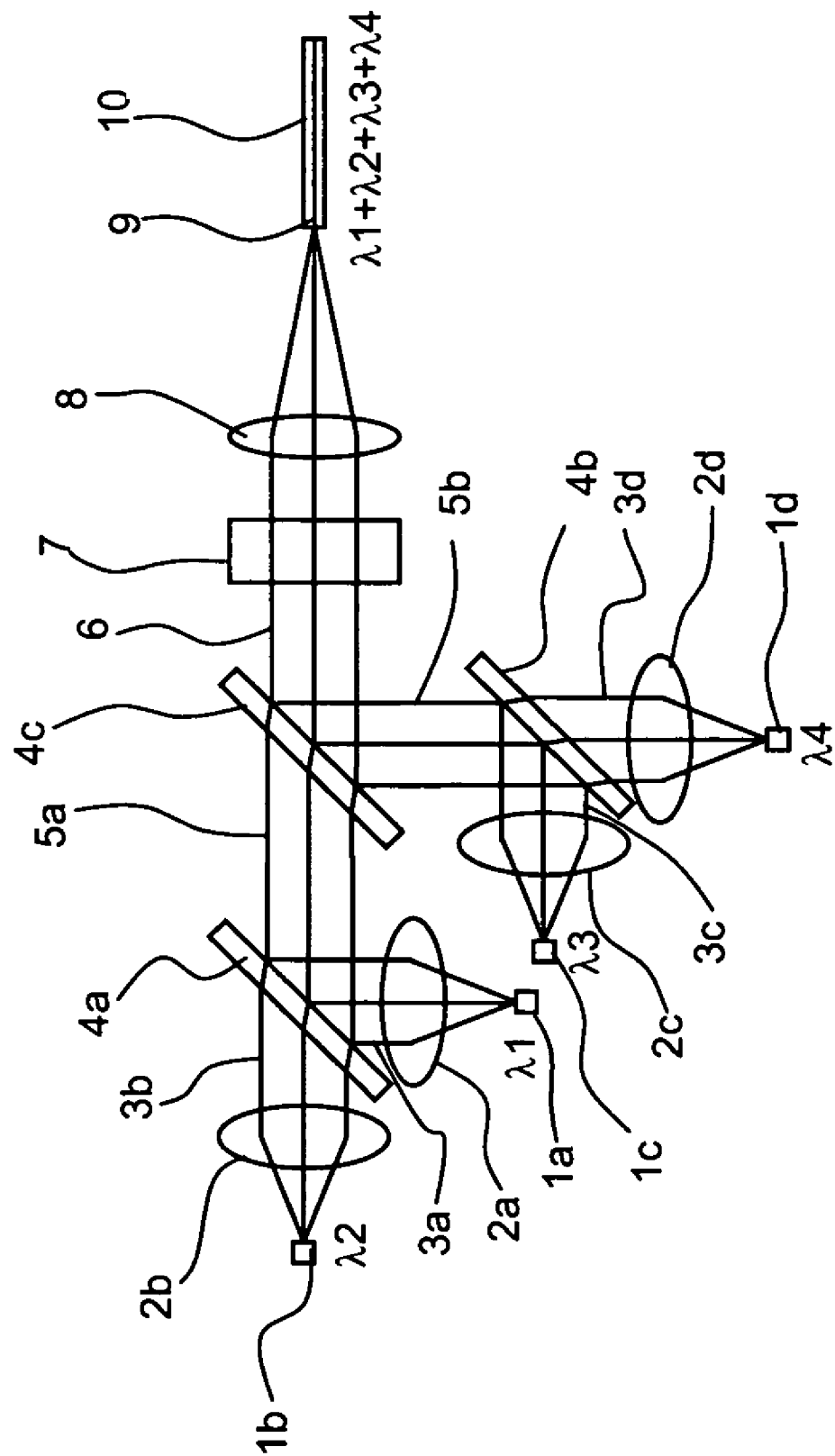
FIG. 4a and FIG. 4b show embodiments of the invention using collimating method with the multiplexer configuration shown in FIG. 3b.
Figure 4B:
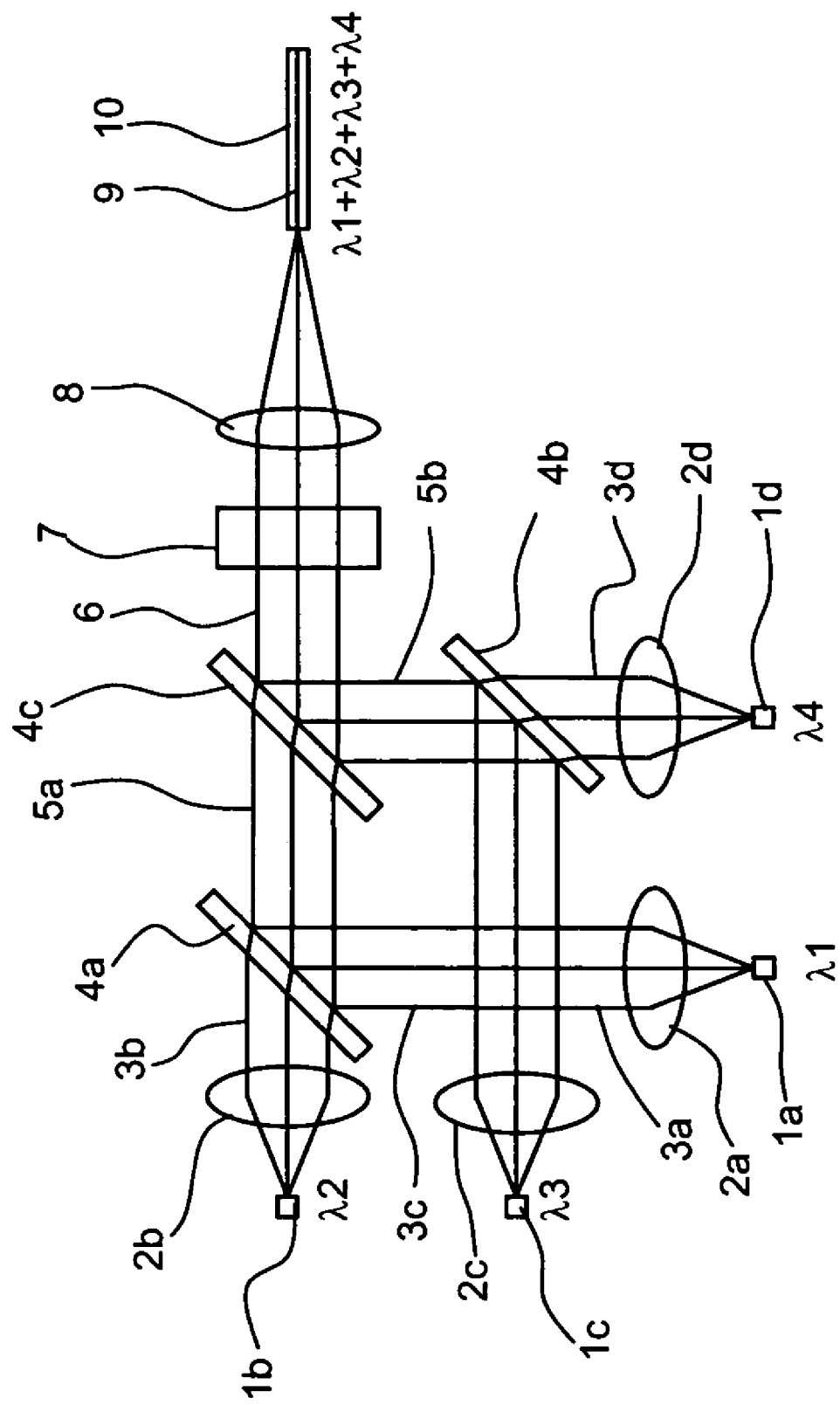

There are some other embodiments of the present invention being illustrated through FIG. 4a to FIG. 7. FIG. 4a and FIG. 4b show embodiments of CWDM TOSA using collimating lenses with multiplexer configuration shown in FIG. 3b. The embodiments shown in FIG. 4a are limited with the use of lasers in submount package due to the potential interference in space for laser 1a and 1c. However, the embodiments can be used to construct very compact CWDM TOSA. FIG. 4b shows an CWDM TOSA configuration same as that shown in FIG. 4a, except for a slight modification of the location of laser 1a and 1c and lens 2a and 2c. The optical path lengths of channel λ1 and λ3 are longer than that shown in FIG. 4a. The placement of laser 1a and 1c are not limited by space, thus TO-CAN packaged lasers can be used. Laser 1a and 1d can be in the same plane, and laser 1b and 1c can be in the same plane that perpendicular to the plane of laser 1a and 1d.

Figure 5:
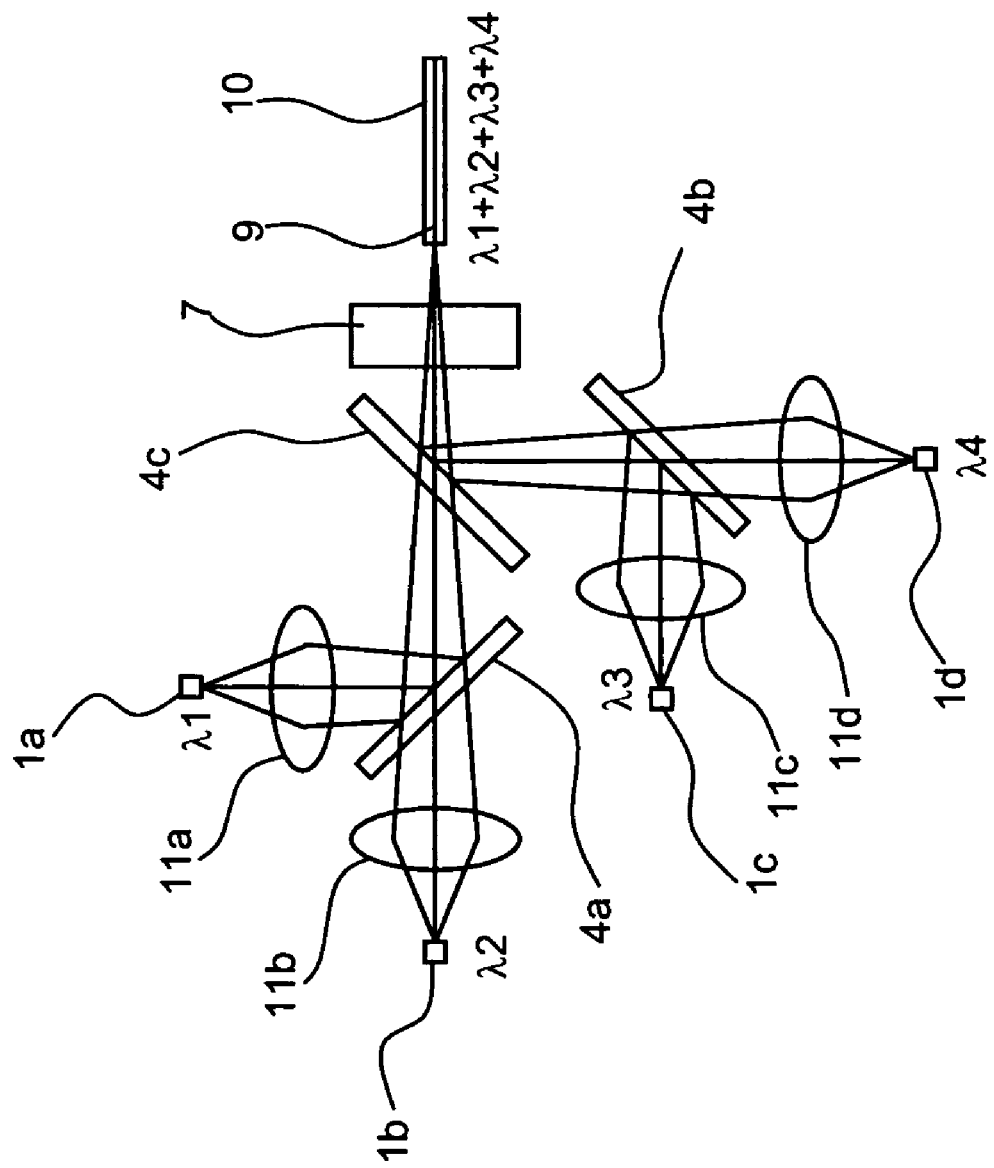
FIG. 5 shows a diagram of embodiments of the multi-wavelength using coupling lenses with beams after the coupling lens combined by the multiplexer.

In some embodiments, the light coupling from the laser to the fiber can be implemented using one coupling lens instead of using a pair of collimating and focusing lenses. The three-filter multiplexer allows short optical paths between the laser and the fiber for all four channels, and thus allows the use of coupling lenses. FIG. 5 shows the embodiments of the optical system using coupling lenses 11a, 11b, 11c, and 11d. The beams after the coupling lenses are combined by three-filter multiplexer. The laser and lens can be either separate packages or they can be packaged together into a lens capped TO can package. Since there is no lens in front of the fiber, the optical system can be even smaller compared with the system shown in FIG. 2. In addition, in the case of coupling lens capped TO CAN laser, there is no optical magnification between the laser tolerance and the fiber tolerance, meaning alignment of the laser is equivalent to the alignment of the fiber. Thus the alignment tolerance can be looser than the system shown in FIG. 2. Therefore, the optical assembly shown in FIG. 5 can be constructed with a very small size and low cost.

Figure 6:
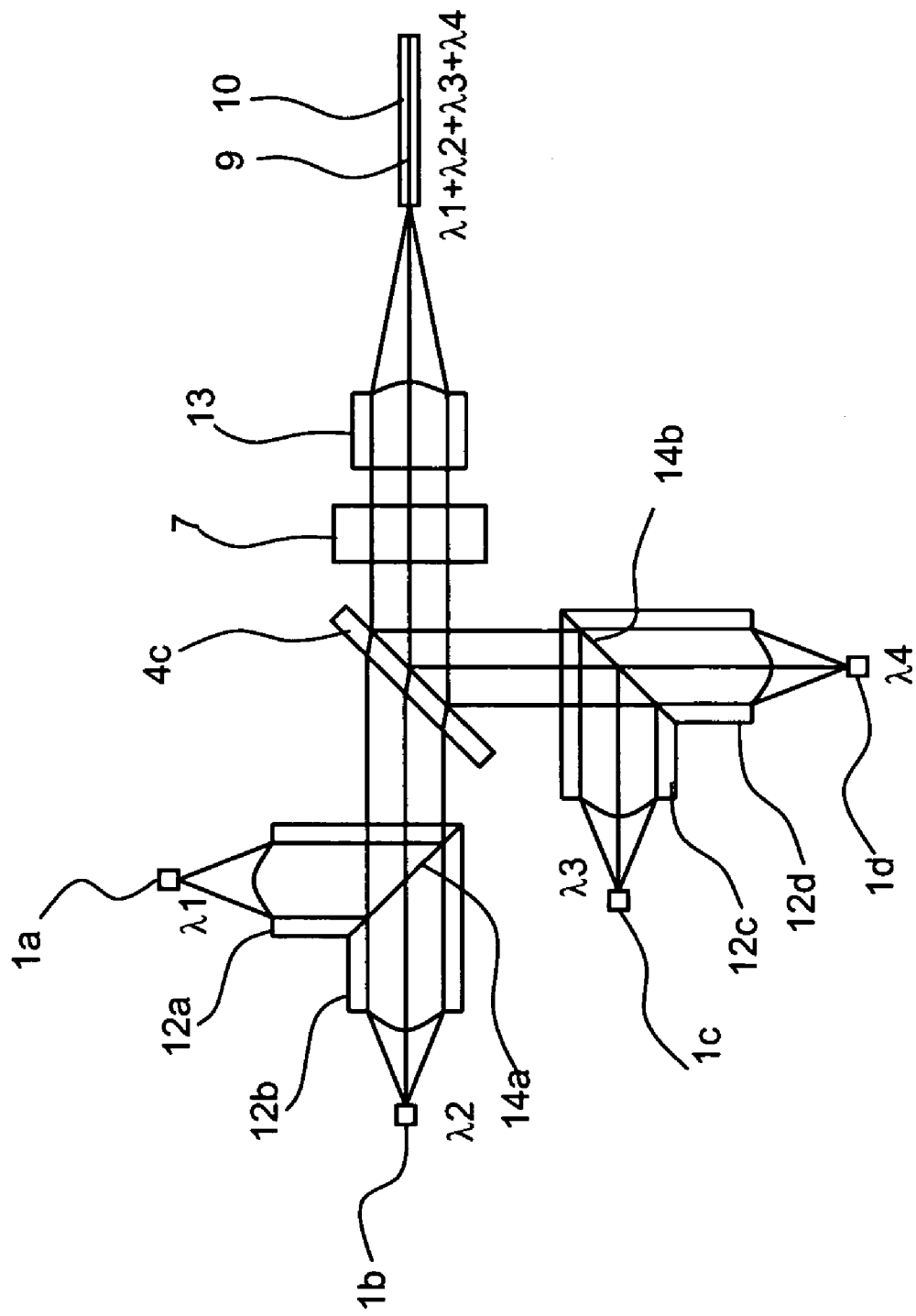
FIG. 6 is an embodiment of the TOSA using the molded optics such that the collimation lens and filter is in one molded component.
Figure 9:
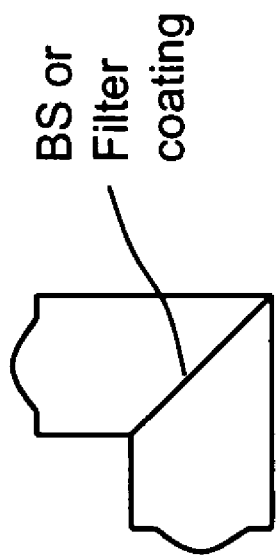
FIG. 9 shows the molded optics assembly with two lenses and one beam-splitter.
Figure 8:
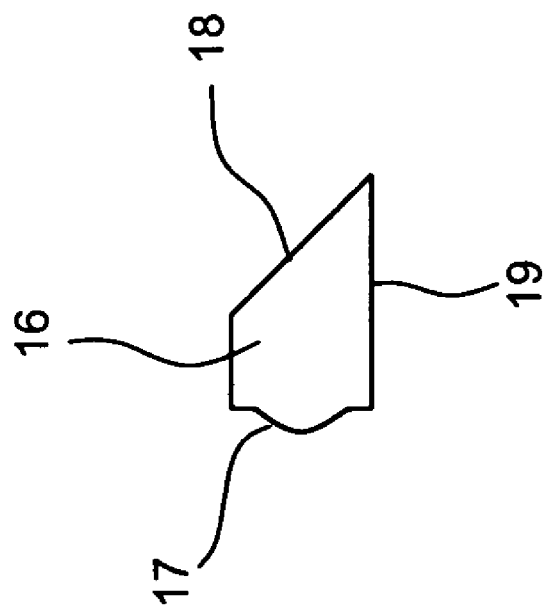
FIG. 8 shows the molded optical component with both lens and beam-splitter. The lens surface can be either collimating lens or coupling lens.

FIG. 6 is an embodiment of the present invention using the molded optics such that a collimation lens and a beam-splitter or filter is in one molded component. Molded glass or plastic parts can potentially provide lower cost systems. The molded lens 12a, 12b, 12c, 12d are the same type of parts. A single molded lens part 16 is shown in FIG. 8. The lens surface 17 typically should be an optimized aspheric surface for best collimation quality using just one optical surface. The 45-degeree surface 18 is a surface that two piece of lens part 16 can be bonded together with epoxy. One of two bonding surfaces 18 should be coated with filter or beam-splitter coating. The bonded part can be regarded as one part as shown in FIG. 9. The lens surface 17 and output surface 19 need to be AR-coated. In the system shown in FIG. 6, the focusing lens 13 can be another molded lens or a lens the same as lens 8 can be used. The molded plastic optical parts can potentially provide much lower cost for CWDM TOSA in mass production.

Figure 7:
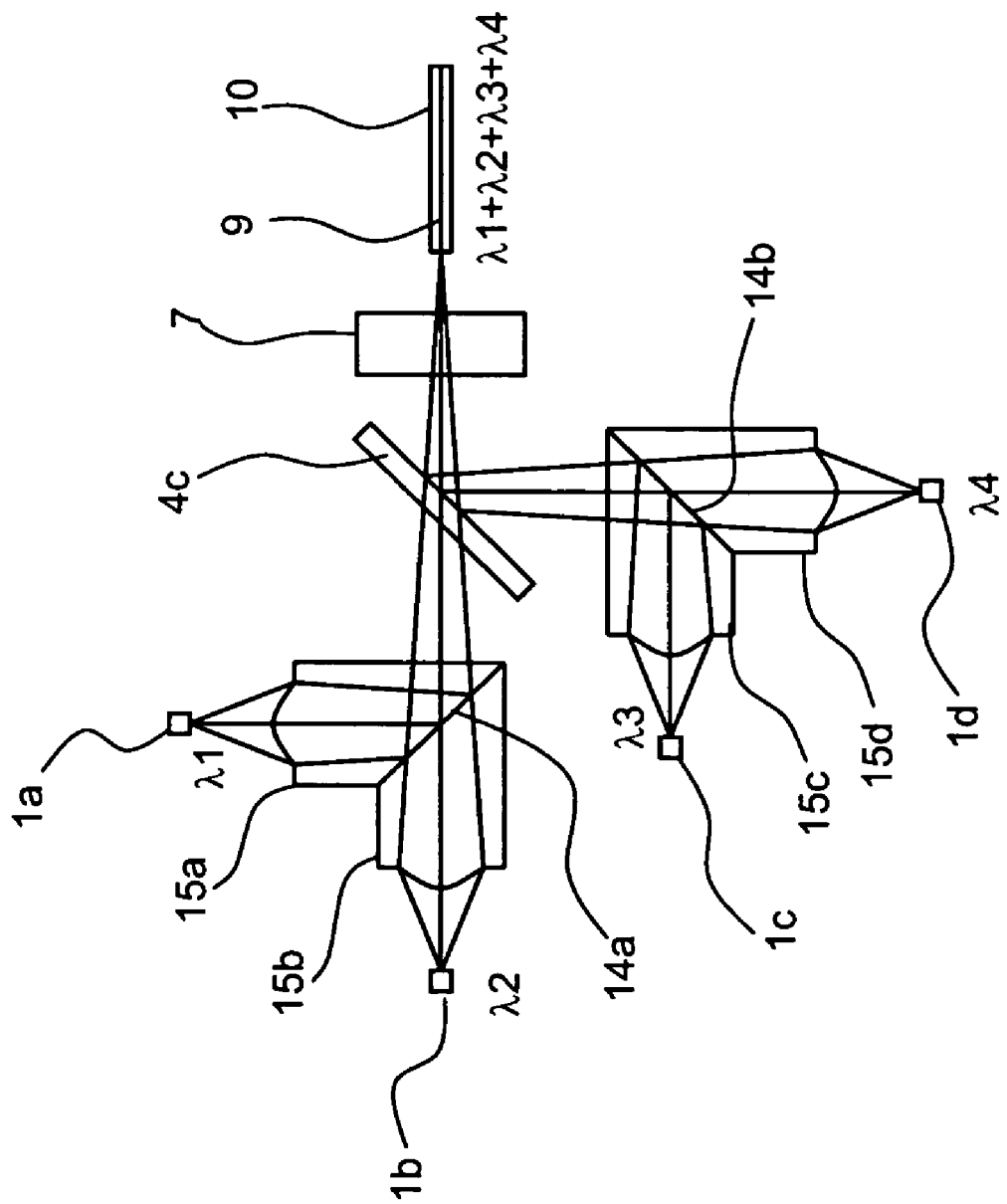
FIG. 7 is an embodiment of the TOSA with molded optics such that the coupling lens and filters is in one molded component.

FIG. 7 is an embodiment of the optical system for CWDM TOSA with molded optics such that the coupling lens and filter is in one molded component. The molded coupling lens 15a, 15b, 15c and 15d surface profile should be different from a collimating lens. The surface needs to be optimized to provide the best coupling quality between the laser and the fiber.

The optical sub assemblies disclosed in this invention are indented to be the basis to construct a TOSA. Other embodiments of the invention will be apparent to those skilled in the art from consideration of the specification of the invention disclosed herein. Various modifications and changes may be made thereto without departing from the broader spirit and scope of the invention. It is intended that the specifications and examples be considered as exemplary only. They are accordingly to be regarded in an illustrative rather than a restrictive sense.

What is claimed is:

1. A multi-wavelength transmitter optical sub assembly, comprising:
   at least 4 light sources, each with a different wavelength;
   an optical fiber;
   a plurality of lenses, each collecting the divergent light from one of said light sources to form a plurality of light beams;
   a multiplexer consisting of a plurality of filters that combine said plurality of light beams into a single light beam through at least 2 stages, with each filter combining a transmission beam and a reflection beam into a common beam, each stage reducing the number of light beams by a half, and light transmission between each stage being in free space; and
   a focusing lens that focuses said single light beam onto said optical fiber.

2. The assembly of claim 1, wherein the plurality of lenses are collimating lenses, each collimating the divergent light from one of the plurality of light sources to form a plurality of collimated beams; and the multiplexer combines the plurality collimated beams into a single collimated beam; and the focusing lens focuses the single collimated beam onto the optical fiber.

3. The assembly of claim 1, wherein the plurality of lenses are coupling lenses, each focusing the divergent light from one of the plurality of light sources to form a plurality of converging beams; and the multiplexer combines the plurality of converging beams into a single converging beam; and the focusing lens further focuses the single converging beam onto the optical fiber.

4. A multi-wavelength transmitter optical sub assembly, comprising:
   at least 4 light sources, each with a different wavelength;
   an optical fiber;
   a plurality of lenses, each collecting the divergent light from one of said light sources to form a plurality of light beams;
   a multiplexer consisting of a plurality of filters that combine said plurality of light beams into a single convergent light beam through at least 2 stages, with each filter combining a transmission beam and a reflection beam into a common beam, each stage reducing the number of light beams by a half; light transmission between each stage being in free space, and the single convergent light beam being coupled to said optical fiber.

5. The assembly of claim 4, wherein each of the light sources and the corresponding lens are integrated into a transistor outline (TO) can package, where the lens is on a lens cap.

6. The assembly of claim 1, wherein the light sources are flat window TO can packaged lasers.

7. The assembly of claim 1, wherein the light sources are bare laser dies mounted on submount.

8. The assembly of claim 1, wherein the lenses are anti-reflection (AR) coated aspheric lenses.

9. The transmitter optical sub assembly of claim 1, further including an optical isolator in the optical path between the last filter and said optical fiber.

10. The assembly of claim 1, wherein the optical fiber is a fiber stub inside a receptacle.

11. The assembly of claim 1, wherein the optical fiber is a section of fiber pigtail.

12. The assembly of claim 1, wherein at least one of the plurality of lenses and one of the plurality of filters is a single integrated piece of molded part.

13. The assembly of claim 1, wherein at least one of the plurality of filters is a broadband beam-splitter.

14. A method of multiplexing light from at least 4 light sources with different wavelengths, comprising:
   using at least 3 optical filters;

combining at the coating surface of each filter a transmission light beam at a wavelength and a reflection light beam at another wavelength;

combining all input beams into a common output beam by arranging the plurality of filters in multiple stages, each stage halving the number of input and output beams and halving the number of filters until a last stage having only one filter, the last stage outputting said common output beam, and the light beams being transmitted in free space between each stage.

15. The method of claim 14, wherein the coating of at least one of the filters is a broadband beam-splitter coating.

16. The method of claim 14, wherein the wavelengths of the transmission beam and the reflection beam are non-adjacent wavelength channels for at least one of the filters, allowing larger transition band of the filter.

17. The method of claim 14, wherein four beams are multiplexed with three filters, and the angle of incidence of each beam is 45°, allowing all beams in only horizontal and vertical directions.

18. The method of claim 17, wherein two out of three filters are configured parallel to each other and the other filter is perpendicular to the two filters.

19. The method of claim 17, wherein all three filters are configured parallel to each other.

20. The transmitter optical sub assembly of claim 4, further including an optical isolator in the optical path between the last filter and said optical fiber.

* * * * *